(12) United States Patent
Kriegelstein

(10) Patent No.: US 8,862,787 B2
(45) Date of Patent: Oct. 14, 2014

(54) METHOD AND APPARATUS FOR INTEGRATING DRIVER(S) OF A PORTABLE DEVICE INTO THE PORTABLE DEVICE

(75) Inventor: John Kellsie Kriegelstein, Beaverton, OR (US)

(73) Assignee: Intel Incorporation, Santa Clara, CA (US)

( * ) Notice: Subject to any disclaimer, the term of this patent is extended or adjusted under 35 U.S.C. 154(b) by 39 days.

(21) Appl. No.: 12/973,446

(22) Filed: Dec. 20, 2010

(65) Prior Publication Data

US 2012/0159521 A1 Jun. 21, 2012

(51) Int. Cl.
G06F 3/00 (2006.01)
G06F 13/12 (2006.01)
G06F 13/38 (2006.01)
G06F 9/44 (2006.01)

(52) U.S. Cl.
CPC ............... *G06F 9/44* (2013.01); *G06F 9/4411* (2013.01)
USPC ................................... 710/8; 710/16; 710/62

(58) Field of Classification Search
None
See application file for complete search history.

(56) References Cited

U.S. PATENT DOCUMENTS

| 6,009,480 | A * | 12/1999 | Pleso ................................ 710/8 |
| 7,237,101 | B1 * | 6/2007 | Dono et al. ........................ 713/1 |
| 7,716,741 | B2 * | 5/2010 | Forman et al. ................... 726/24 |
| 2002/0078142 | A1 | 6/2002 | Moore |
| 2004/0030810 | A1 * | 2/2004 | Lozano ............................. 710/8 |
| 2006/0031623 | A1 | 2/2006 | Bando |
| 2006/0152293 | A1 * | 7/2006 | McCorquodale et al. ...... 331/74 |
| 2007/0288936 | A1 * | 12/2007 | Wu et al. ........................ 719/322 |
| 2008/0081667 | A1 * | 4/2008 | Parikh et al. ................... 455/558 |
| 2009/0257080 | A1 | 10/2009 | Herrmann |

FOREIGN PATENT DOCUMENTS

| EP | 1662385 A2 | 5/2006 |
| JP | 2002342251 A | 11/2002 |
| JP | 2003022427 A | 1/2003 |
| JP | 2005321907 A | 11/2005 |
| JP | 2010067198 A | 3/2010 |
| WO | 2012/087558 A2 | 6/2012 |
| WO | 2012/087558 A3 | 8/2012 |

OTHER PUBLICATIONS

Office Action received for Chinese Application No. 201120536680.0, mailed on Jun. 12, 2012, 2 pages of Office Action and 2 pages of English Translation.

(Continued)

*Primary Examiner* — Zachary K Huson
(74) *Attorney, Agent, or Firm* — Green, Howard & Mughal, LLP

(57) ABSTRACT

A portable device may be connected to a host system using a connection technology such as the universal serial bus (USB) or the IEEE 1934, either via wire or wirelessly. A driver that enables the portable device to properly interact with the host system may be stored in a non-volatile memory inside the portable device. When the portable device is connected to the host system, the portable device may automatically install the driver stored therein in the host system if it is determined that the host system does not have driver for the portable device or the driver in the host system are outdated by the driver stored in the portable device. When connected to the Internet, the portable device may further search the Internet for the latest driver. The portable device may download and install in the host system the latest driver found in the Internet and update the driver stored in the portable device accordingly, if appropriate.

23 Claims, 6 Drawing Sheets

(56) References Cited

OTHER PUBLICATIONS

International Search Report and Written Opinion received for PCT Application PCT/US2011/063436 mailed on Jun. 27, 2012, 11 Pages.
Decision of Rejection issued for Chinese Utility Model Patent Application No. 201120536680.0, mailed Apr. 2, 2013, 5 pages.
Second Office Action mailed Nov. 28, 2012 for Chinese Utility Model Patent Application No. 2011 20536680.0.
Notification Concerning Transmittal of International Preliminary Report on Patentability (Chapter I of the Patent Cooperation Treaty), issued for International Application No. PCT/US2011/063436, mailed Jul. 4, 2013.
Office Action received for Korean Patent Application No. 10-2013-7015862, mailed on Apr. 29, 2014, 4 pages of English Translation and 5 pages of Korean Office Action.
Office Action received for Chinese Patent Application No. 2011205366800, mailed on Mar. 25, 2014, 4 pages of English Translation and 3 pages of Chinese Office Action.
Office Action received for Japanese Patent Application No. 2013-543251, mailed on Apr. 15, 2014, 5 pages of English Translation and 4 pages of Japanese Office Action.

* cited by examiner

METHOD AND APPARATUS FOR INTEGRATING DRIVER(S) OF A PORTABLE DEVICE INTO THE PORTABLE DEVICE

BACKGROUND

1. Field

This disclosure relates generally to portable devices coupled to an electronic device, more specifically, to a portable device with an integrated driver, which may install the driver automatically once the device is coupled to a host electronic device.

2. Description

There are a number of connection technologies which help connect portable devices to a host electronic device. Portable devices include computer peripheral devices such as cameras, mice, keyboards, printers, flash drives, external hard drives, media players, network adaptors, etc. The host electronic device may include a desktop computer, a laptop computer, a tablet, a netbook computer, a smart phone, and so on. A host device may also be coupled to another host electronic device as a peripheral device. Connection technologies include but not limited to the Universal Serial Bus (USB), IEEE 1934 interface, and eSATA.

The USB is an industrial standard for a serial bus interface to establish communications between devices and a host such as a personal computer (PC). The USB supports functional data and control exchange between the USB host and a USB device as a set of either uni-directional or bi-directional pipes. USB data transfers take place between host software and a particular endpoint on a USB device. The USB host interacts with USB devices through a USB Host Controller (HC). The USB system software on the host manages interactions between USB devices and host-based device software. The USB standard supports plug and play and hot swapping.

The IEEE 1934 interface is a serial bus interface standard for high-bandwidth communications and isochronous real-time data transfer. It may be used by PCs, digital audio/video applications. This interface may also be referred to as FireWire, i.LINK, or Lynx. The IEEE 1934 may connect a number of peripherals (e.g., 63) in a tree chain topology. It may be used to replace parallel Small Computer System Interface (SCSI) connection in many applications. It allows peer-to-peer device communication such as communications between a scanner and a printer to take place without using system memory or the Central Processing Unit (CPU). It is designed to support plug and play and hot swapping.

The eSATA, which stands for external Serial Advanced Technology Attachment (SATA), is a variation of the SATA interface standard. The SATA interface is a bus interface for connecting host bus adapters to mass storage devices such as hard disk drives and optical drives. The eSATA is designed for external connectivity, for example, connecting a PC to an external hard disk drive.

Whichever connection technology is used, it is normally necessary to install a device driver of a portable device in the host in order for a user to use the portable device to interact with the host. For example, a digital camera with a USB port normally comes with an installation Compact Disc (CD) which includes a driver for the digital camera. In order to transfer a digital picture between a PC and the digital camera through the USB connection, the driver needs to be first installed in the PC. Similarly it needs to install a driver in a PC to transfer video data between a camcorder with an IEEE 1934 port and the PC via the IEEE 1934.

Typically each portable device has its own driver which normally cannot be shared with another device, even if the other device is of the same type but manufactured by a different manufacturer. Thus, a user needs to save the installation CD for a portable device for later use. For example, if a PC is crashed and needs to be rebuilt at a later time, the user needs to find the CD to install the driver for the portable device again. At that time, the user might not be able to find the installation CD any more. Therefore, it is not very convenient to have a driver CD for a portable device.

BRIEF DESCRIPTION OF THE DRAWINGS

The features and advantages of the disclosed subject matter will become apparent from the following detailed description of the subject matter in which.

DETAILED DESCRIPTION

According to embodiments of the disclosed subject matter in this application, a driver for a portable device may be integrated with the portable device itself. The driver may be stored in a non-volatile memory within the portable device. When the portable device is coupled to a host device, either via wire or wirelessly, the portable device may be recognized by the operating system (OS) of the host device. If the host device has the driver of the portable device previously installed, the portable device may start communicating with the host device and be used by the user directly. If the host device does not recognize the portable device or does not have a working driver installed in the host device for the portable device, the portable device may appear to the OS of the host as a flash drive. An auto-execution program stored in a non-volatile memory of the portable device may run to install the driver stored in the non-volatile memory of the portable device to the host device according to one embodiment of the present invention. If the host device is connected to the Internet, the auto-execution program may retrieve the latest update of the driver via the Internet and update the driver stored in the non-volatile memory of the portable device. In one embodiment, the auto-execution program may periodically check for any update for the drive and update the drive locally stored in the portable device.

Some devices may need more than one driver to interact with a host. For brevity and convenience of description, only a single term "driver" will be used to refer to either one driver or multiple drivers, even if the term may follow numerical terms such as "a" or "one", throughout the specification, drawings, claims, and abstract that follow.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
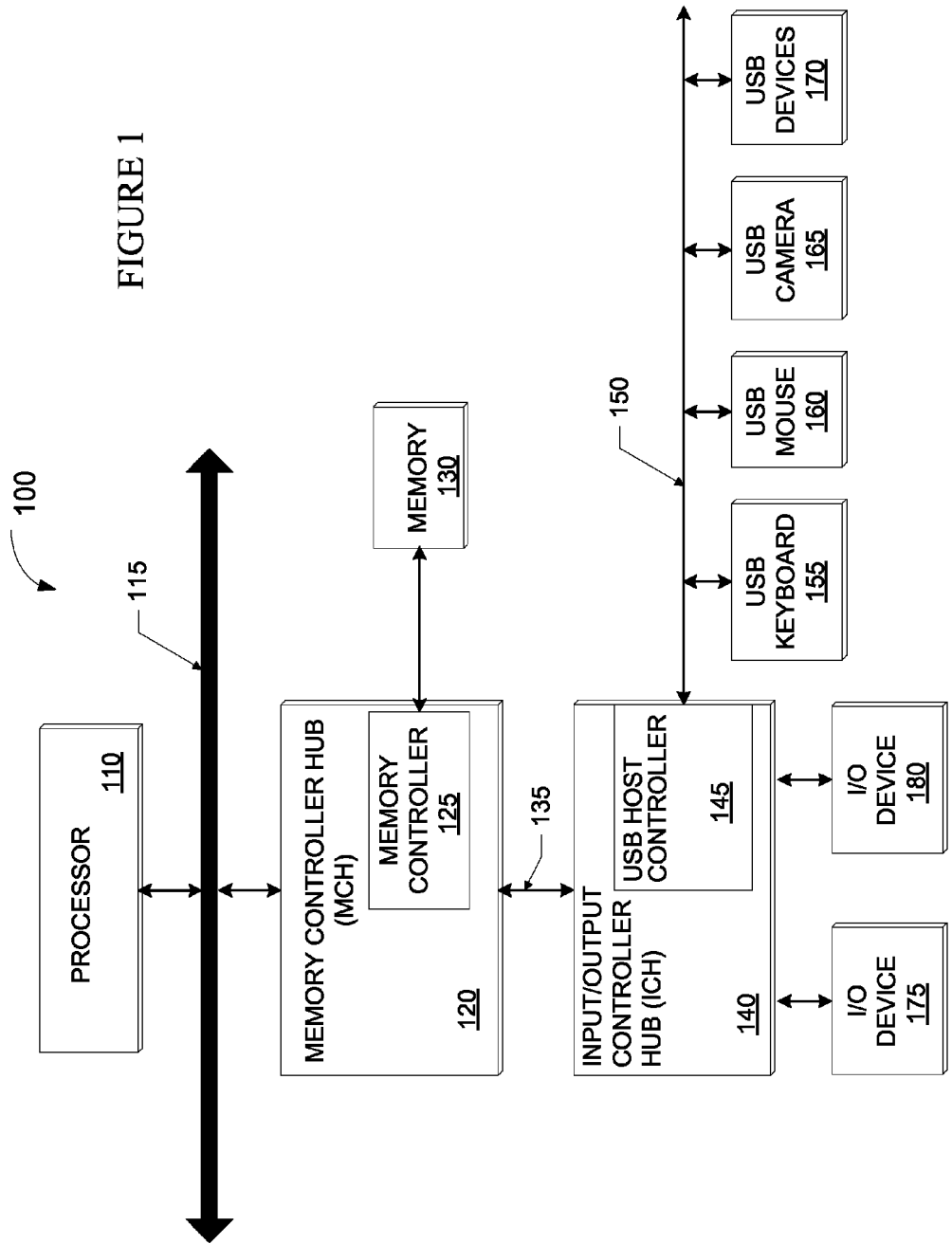
FIG. 1 shows one example system in which portable devices are connected to a host device using the USB interface, according to one embodiment of the present invention.

FIG. 1 shows one example system 100 in which portable devices are connected to a host device using the USB interface. The system 100 includes a processor 110, a Memory Controller Hub (MCH) 120 and an Input/Output (I/O) Controller Hub (ICH) 140. Although one processor is shown in the figure, there may be more than one processor in the system 100. Each processor such as processor 110 may have one or more processing cores and is coupled to the system interconnect 115.

The system interconnect 115 provides interface signals to allow the processor 110 to communicate with other processors or devices, e.g., the MCH 120. The system interconnect 115 may support a uni-processor or multiprocessor configuration. The system interconnect 115 may be a Front Side Bus (FSB), a links-based point-to-point interconnect, or any other type of interconnect; and may be parallel, sequential, pipelined, asynchronous, synchronous, or any combination thereof.

The MCH 120 may be coupled to the system interconnect 115. The MCH 120 provides control and configuration of memory and input/output devices such as the system memory 130 and the ICH 140. The MCH 120 may be integrated into a chipset that integrates multiple functionalities such as the isolated execution mode, host-to-peripheral bus interface, memory control. The chipset may also integrate functions of ICH 140. For clarity, not all the peripheral buses are shown. It is contemplated that the system 100 may also include peripheral buses such as Peripheral Component Interconnect (PCI), accelerated graphics port (AGP), and Industry Standard Architecture (ISA) bus, etc. The MCH 120 includes a memory controller 125 that controls communication between the processor 110 and memory 130. The processor 110 and MCH 120 communicate over the system interconnect 115. In an alternate embodiment, the functions in the MCH 120 may be integrated in the processor 110 and the processor 110 may be coupled directly to the ICH 140.

Main memory 130 may store data and sequences of instructions that are executed by the processor 110 or any other device included in the system. The memory controller 125 may access the main memory 130 in response to memory transactions associated with the processor 110, and other devices in the computing system 100. The main memory 130 may comprise various memory devices that provide addressable storage locations which the memory controller 125 may read data from and/or write data to. The main memory 130 may comprise one or more different types of memory devices such as Dynamic Random Access Memory (DRAM) devices, Synchronous DRAM (SDRAM) devices, Double Data Rate (DDR) SDRAM devices, or other memory devices.

The Input/Output Controller Hub (ICH) 140 may be coupled to the MCH 120 using a high speed chip-to-chip interconnect 135 such as Direct Media Interface (DMI), or any other type of chip to chip interface. DMI supports 2 Gigabit/second concurrent transfer rates via two unidirectional lanes. The ICH 130 has a number of functionalities that are designed to support I/O functions. The ICH 140 may also be integrated into a chipset together or separate from the MCH 120 to perform I/O functions. The ICH 140 may include a number of interfaces and I/O functions such as PCI bus interface, processor interface, interrupt controller, direct memory access (DMA) controller, power management logic, timer, universal serial bus (USB) interface, mass storage interface, low pin count (LPC) interface, etc. I/O device 175 and I/O device 180 may be coupled to the ICH 140 via a PCI bus interface or any other type of interfaces.

In particular, the ICH 140 includes a USB host controller (HC) 145 coupled to USB bus 150. Although not shown in the figure, the ICH 140 may include more than USB host controller. The USB host controller 145 may provide one or more USB ports. The USB host controller 145 contains a number of host controller registers as defined in the USB standard (e.g., USB 2.0, USB 3.0). Examples of these registers include USB command register, USB status register, USB interrupt enable register, USB frame number register, USB frame list base address register, USB start of frame (SOF) register, USB Port 0 Status and Control register, and USB Port 1 Status and Control register. The USB bus 150 is coupled to a number of USB devices such as USB keyboard 155, USB mouse 160, USB camera 165, and other USB devices 170.

A data transfer (transaction) between a USB host controller and a USB device is initiated when the host controller sends a USB packet that identifies the type and direction of the data transfer, the address of the USB device and an endpoint number in the device. An endpoint is a uniquely identifiable portion of a USB device that is the terminus of a communication flow between the USB host and the USB device. The endpoint direction may be IN (to host) or OUT (from host).

Data and control exchange between the USB host and the USB device is supported as a set of either unidirectional or bidirectional logical pipes. A logical pipe is a logical abstraction between the USB host and an endpoint in a USB device to exchange data and control packets between the USB host and the USB device. The USB device may transfer data over a plurality of logical pipes (pipe bundle) to a host, for example, there may be a separate unidirectional logical pipe for transporting data to an OUT endpoint in the USB device and another unidirectional logical pipe for transporting data to the USB host from an IN endpoint in the USB device.

When a USB device (e.g., a USB camera 165) is first connected to a USB host (e.g., system 100 in FIG. 1) via a USB port, the USB host controller 145 determines whether the device is supported. If it is supported, the device driver needed for communicating between the host and the device are loaded. When a USB device is very common (e.g., a USB keyboard 155), the host may have driver for the device. In this case, the driver can be loaded from the host itself. If the device driver cannot be found in the host, the host may search the Internet (if it is connected to the Internet) to find the device driver. If the device driver can be found on the Internet, they can be downloaded to the host. Very often a USB device comes with an installation medium (e.g., CD) with device driver stored thereon. The device driver can be loaded from the installation medium. Once the device driver are loaded to the host, they do not need to be loaded again the next time the device is reconnected to the host.

In reality, the device driver for a USB device in the host may be damaged or lost (e.g., due to rebuilding). When such an issue occurs, the device driver will need to be repaired or reinstalled in the host. However, the installation medium might not be able to be found; or the medium may be damaged. It is not always possible to find the driver for a particular device on the Internet. Apparently this can be a problem to a user.

According to one embodiment of the present invention, the driver of a USB device may be stored inside the device itself. For example, the USB camera 165 in FIG. 1 may have its driver stored in a flash memory inside itself. When the USB camera 165 is first time connected to the system 100, the driver of the USB camera 165 may be automatically installed in the system 100. Periodically the USB camera 165 may search the Internet for any update to the driver and download the updates to the flash memory inside the USB camera 165. This way, when reinstallation of the driver is needed, the updated driver may be reinstalled from the USB camera 165 without the burden of finding the original installation medium. A user does not have to keep another item.

Figure 2:
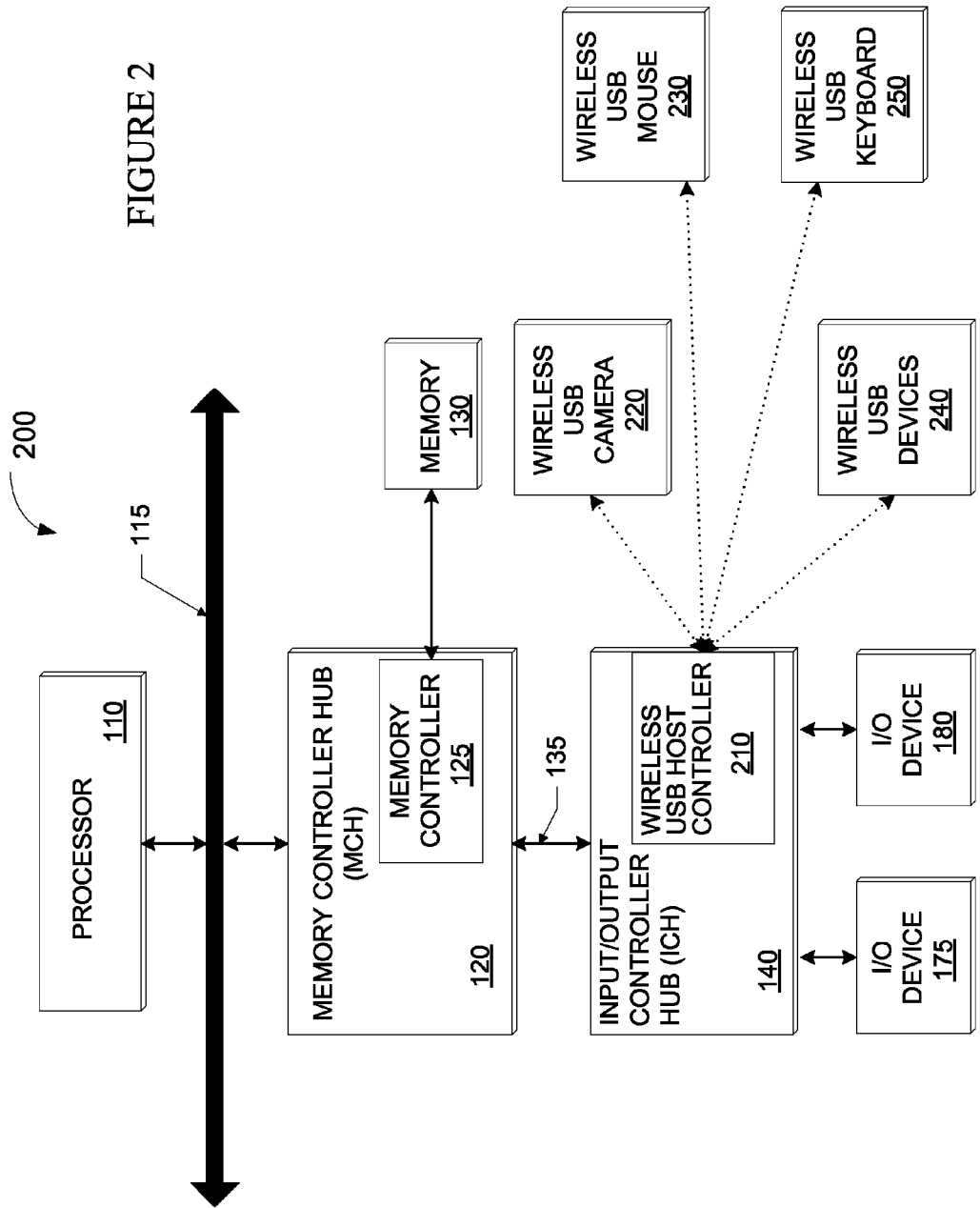
FIG. 2 shows another example system where portable devices are connected to a host device using the wireless USB interface, according to one embodiment of the present invention.

FIG. 2 shows another example system 200 where portable devices are connected to a host device using the wireless USB interface. The system 200 is shown to have similar components as system 100 in FIG. 1 except those related to the USB interface. Particularly, system 200 includes a wireless USB host controller 210 which facilitates wireless connection between system 200 and wireless USB devices such as wireless USB camera 220, wireless USB mouse 230, wireless USB keyboard 250, and other wireless USB devices 240. In addition, wireless USB host controller 210 may also perform functions of a wired USB host controller such as USB host controller 145. Similarly a wireless USB device (e.g., 220) may have its driver stored in a flash memory inside itself. When the wireless USB is first connected wirelessly to system 200, the driver stored therein may be installed in system 200 which will allow the wireless USB device to communicate with system 200. The wireless USB device may also search the Internet for any updates to the driver and periodically download the updates to the flash memory therein.

Although FIGS. 1 and 2 show examples using the USB connection, other connection technologies may also be used. In one embodiment, IEEE 1934 interface may be used. A portable IEEE 1934 device may be connected to a host (e.g., 100) via wire or wirelessly. The portable device may have its driver stored in a flash memory or other non-volatile memory inside the device. When the device is first connected to the host, the driver may be installed in the host. The device may search the Internet for updates to its driver and periodically store the updates to the non-volatile memory inside the device. In another embodiment, the eSATA interface may be used to connect a portable device to a host either via wire or wirelessly. The driver of the portable eSATA device may be stored in a non-volatile memory inside the device; and may be installed in the host when the portable eSATA device is first connected to the host. The driver stored therein may be updated periodically by downloading updates from the Internet.

Figure 3:
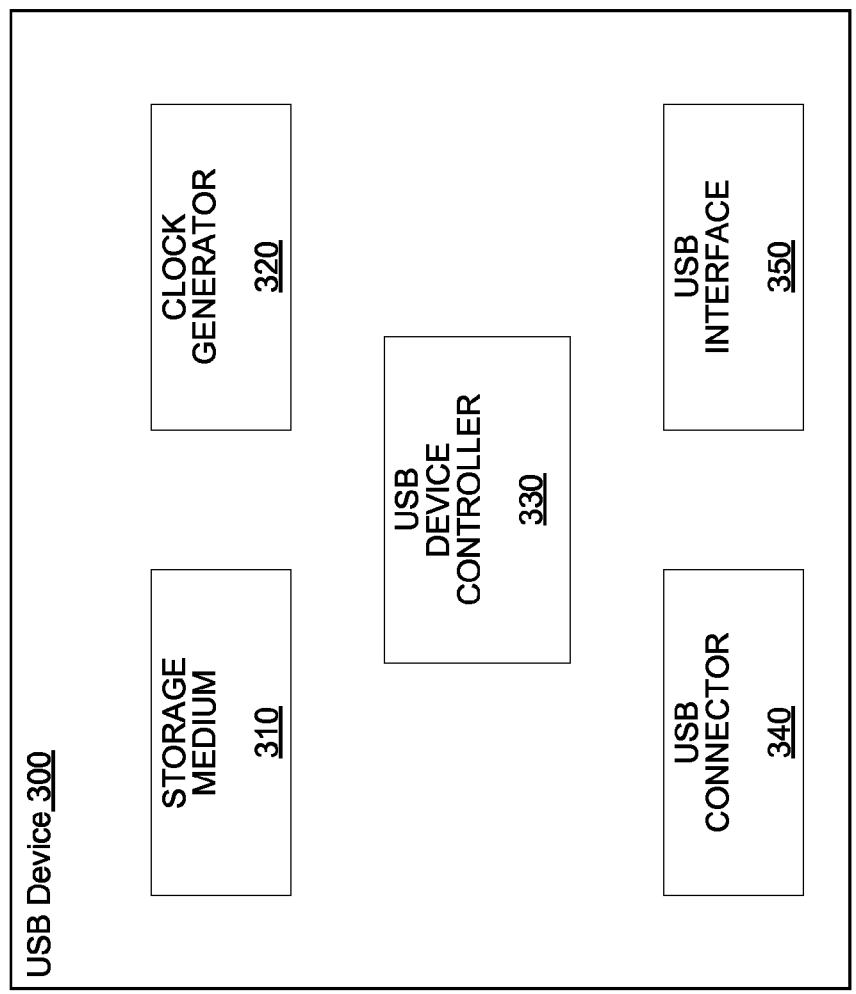
FIG. 3 is a block functional diagram of a USB device according to one embodiment of the present invention.

FIG. 3 is a block functional diagram of a USB device 300 according to one embodiment of the present invention. The USB device 300 includes a storage medium 310, a clock generator 320, a USB device controller 330, a USB connector 340, and a USB interface 350. The storage medium 310 may include a flash memory or other types of non-volatile memory to store driver for the USB device 300. The storage medium 310 may also store other data for the USB device 310 such as instructions used by the USB device controller 330 to control the operations of the USB device 300. The clock generator 320 may include an oscillator to produce the main clock signal for the USB device 300. The clock generator 320 may also control the data output of the USB device 300 though a phase-locked loop (PLL).

The USB connector 340 provides a physical interface to a host device such as a PC. The USB standard specifies several types of connectors. For example, the standard type A connector is a flattened rectangle which inserts into a receptacle on a USB host or a hub and carries both power and data. The standard type A connector is frequently seen on USB keyboard, mouse, or flash drive. For another example, the standard type B connector has a square shape with beveled exterior corners and typically plugs into an upstream receptacle on a device that uses a removable cable (e.g., a printer). There are other types of connectors such as USB mini and micro connectors which are typically used for smaller devices such as mobile phones and digital cameras.

The USB interface 350 provides interfacing functions between a host and the USB device 300. For example, the USB interface 350 may include a transmitter to transmit data from the USB device 300 to the host and a receiver to receive data from the host to the USB device 300. The transmitter and the receiver may be combined together as a transceiver to perform the transmitting and receiving functions. The USB interface 350 may also include a module to format the data according to the USB standard before transmitting the data to the host and to pre-process the data received from the host (e.g., extract required information from USB-format data stream) before processing the data. The formatting data may include compressing the data and the pre-processing may include decompressing the data. In addition, the USB interface 350 may perform part or all of protocol functions required by the USB standard.

The USB device controller 330 controls operations of other components in the USB device 300. In one embodiment, the USB device controller 330 may include a small microcontroller with a small amount of on-chip memory. The microcontroller may include a central processing unit (CPU). In one embodiment, the USB device controller 330 may simulate the functionality of a USB flash drive, which makes the USB device 300 appears to be a flash drive to a host, when it is connected to the host. The USB device controller may include a module 335 to handle auto-installation and security issues. The module 335 may be implemented in software, firmware, hardware, or any combination thereof. When the USB device 300 is connected to a host, the host would recognize the device 300 as a flash drive due to the simulated USB flash drive functionality of the device controller 330. The module 335 first checks if the host has the necessary driver for the USB device 330 to interact with the host properly. If no, the module 335 may initialize the installation in the host of the driver stored in the storage medium 310. If the host already has the driver for the USB device 330, the module 335 would further compare the driver in the host with the driver stored in the storage medium 310. If the driver stored in the storage medium 310 is more updated than the driver in the host, the module 330 may update the driver in the host with the driver stored in the storage medium 310. The module 335 may further provide a user with a choice whether the user wants to update the driver in the host before performing the updating process.

In one embodiment, the module 335 may further search the Internet (if the host is connected to the Internet) for any updates to the driver stored in the storage medium 310 or more updated driver. If more updated driver or updates are found, the module 335 may check if the more updated driver of the updates are infected by viruses. The module 335 may invoke the OS of the host to perform such virus check. If no virus is found, the module 335 may ask the user whether he/she wants to download the more updated driver of the updates. If allowed, the module 335 may download the more updated driver or the updates and install them in the host. If the installation is successful, the more updated driver or the updates may be stored in the storage medium 310. Depending on the way that the downloaded updates work, the downloaded updates may update the driver stored in the storage medium or simply store the updates separately in the storage medium 310. If the updates are stored separately in the storage medium, the module 335 will consider both the originally stored driver and any updates in the storage medium 310 whether it decides to install the driver or update the driver in the host, when the USB device is connected to a host next time. In another embodiment, the module 335 might not search the Internet for updates to the driver every time the USB device is connected to the host. The module 335 may choose to periodically (e.g., every 2 months) check for updates to the driver. Similarly, the module 335 may also search the Internet for any fixes or firmware updates for the device 300 while it searches for a driver or update to the driver on the Internet. If any of these is found, the module 335 may download it through a host system to the device 300 to fix any bugs the device may have and/or updates the firmware of the device. Fixes and/or firmware updates are scanned for virus and a user is asked for permission before they are downloaded.

Additionally, the module 335 may encrypt data before the data is sent to the host, and decrypt data after the data is received from the host. In one embodiment, the encryption and decryption functions may be performed by the USB interface 350.

Figure 4:
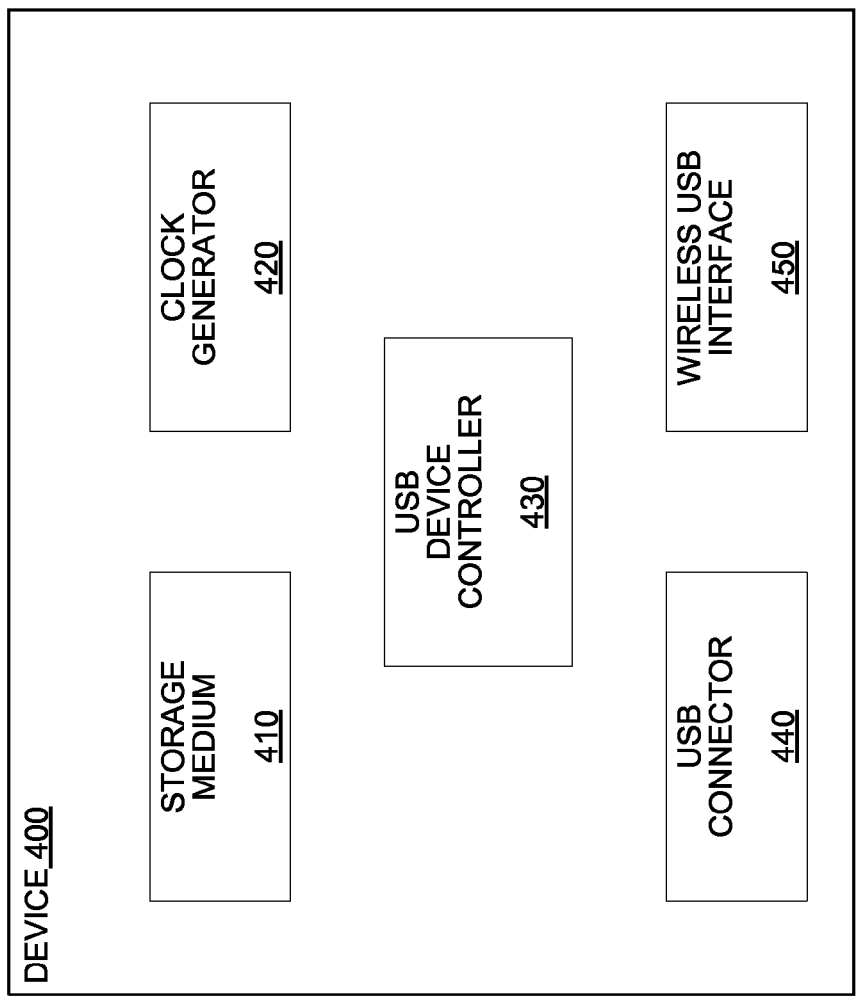
FIG. 4 is a block functional diagram of a device using wireless USB connection, according to one embodiment of the present invention.

FIG. 4 is a block functional diagram of a device 400 using wireless USB connection. The device 400 includes a storage medium 410, a clock generator 420, a USB device controller 430, a USB connector 440, and a USB interface 450. The storage medium 410, the clock generator 420, and the USB connector 440 may be similar to the storage medium 310, the clock generator 320, and the USB connector 340 in the USB device 300, respectively. The USB connector 440 may allow the device 400 to connect to a host via wire or a physical connector. The wireless USB interface 450 provides a wireless interface between the device 400 and a host, in addition to performing functions a wired USB device interface (e.g., USB interface 350 in FIG. 3) typically provides. The wireless USB interface 450 may provide a wireless signal transmitter and a wireless signal receiver.

The USB device controller 430 may be similar to the USB device 330 as shown in FIG. 3. It may perform functions similar to those of the USB device controller 335 as described above. Additionally, the USB device controller 430 would perform checking, comparing, installing/updating, searching for and downloading updates, as described for the USB device controller 335 above, when the device 400 is wirelessly connected to a host.

Figure 5:
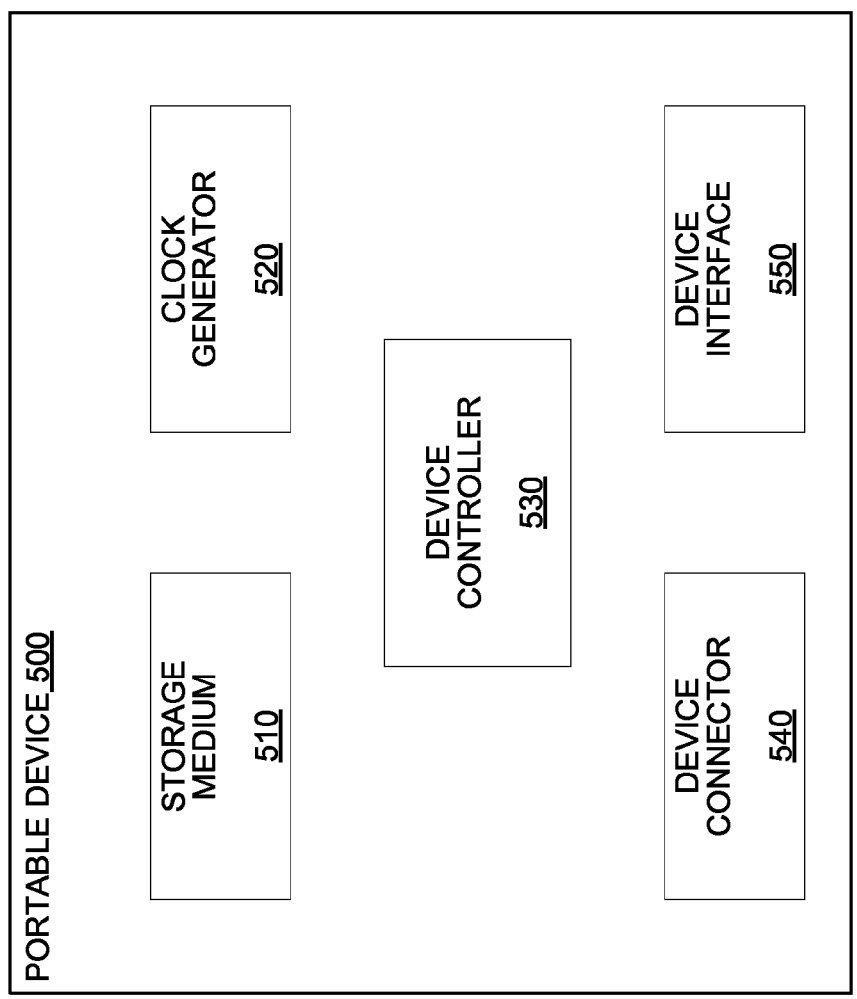
FIG. 5 illustrates a block functional diagram of a portable device which may be connected to a host device using a connection technology according to one embodiment of the present invention.

FIG. 5 illustrates a block functional diagram of a portable device 500 which may be connected to a host device using a connection technology according to one embodiment of the present invention. Similar to the device 400 shown in FIG. 4, the portable device 500 may include a storage medium 510, a clock generator 520, a device controller 530, a device connector 540, and a device interface 550. However, the portable device 500 may use a different connection technology than the USB technology to connect to a host. For example, the portable device 500 may use IEEE 1934 or eSATA interface to connect to a host either via wire or wirelessly. Except the connection technology, the storage medium 510, the clock generator 520, the device controller 530, the device connector 540, and the device interface 550 may be similar to and perform similar functions of the storage medium 410, the clock generator 420, the device controller 430, the device connector 440, and the wireless device interface 450 as shown in FIG. 4 and described above, respectively.

Figure 6:
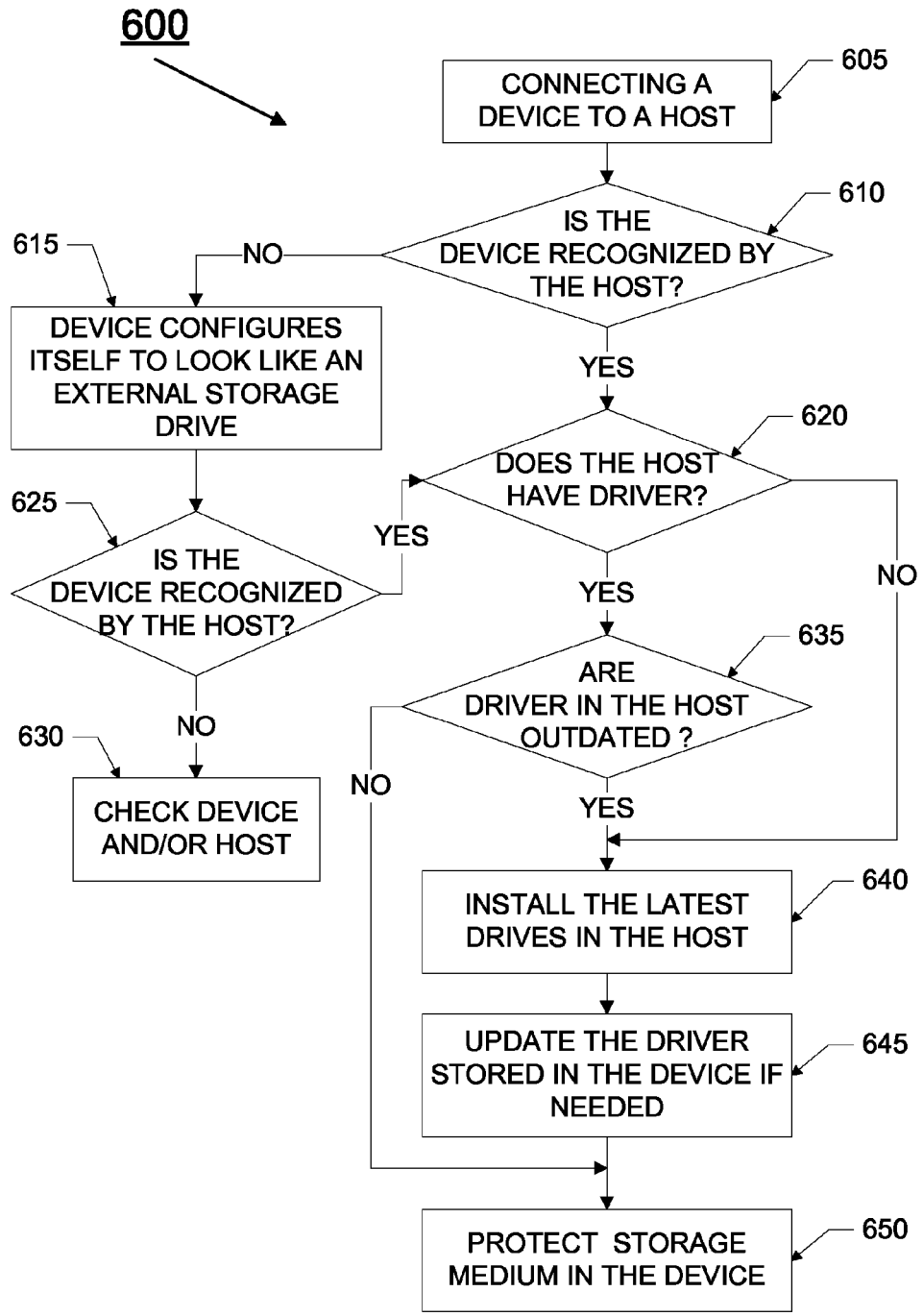
FIG. 6 is flowchart illustrating a process for initiating USB operations when a USB device is coupled to a host, according to one embodiment of the present invention.

FIG. 6 is flowchart illustrating a process 600 for initiating USB operations when a USB device is coupled to a host, according to one embodiment of the present invention. At block 605, a device is connected to a host via a connection technology such as the USB interface or any other types of interfaces (e.g., IEEE 1934, eSATA). The connection can be via wire or wireless. At block 610, it is determined whether the device is recognized by the host. If no, the device may configure itself to appear to the host as an external storage drive such as a USB flash drive at block 615. At block 625, it may be further determined whether the device is recognized by the host. If no, it may be recommended that a user check the device or the host at block 630. This may be due to a defect of the device or due to the fact that the host simply does not support an external storage drive. The user may need to seek help from the host and/or device manufacturer(s).

If the device is recognized by the host at block 610 or at block 625, it may be further determined at block 620 whether the host has necessary driver for the device to interact with the host properly. If yes, it may be further determined whether the driver in the host are outdated by the driver stored in a storage medium (e.g., flash memory) in the device at block 635. If no, the device may be used with the host. At block 650, the storage medium in the device may be protected so that the content stored therein (e.g., device driver) will not be compromised (for example, accidently overwritten by a user). In one embodiment, the storage medium in the device may be hidden from applications running in the host. In another embodiment, the user may be given an option to access the storage medium in the device but will be prompted whenever the content stored therein is likely to be compromised.

If it is determined at block 620 that the host does not have driver for the device, or it is determined at block 635 that the driver in the host are outdated by the driver in the device, the latest driver for the device may be installed in the host at block 640. If there is Internet connection, Internet search may be conducted for the latest driver for the device. If the driver stored in the storage medium in the device is outdated by the latest driver found in the Internet, the latest driver found in the Internet may be downloaded and installed in the host. In one embodiment, the latest updates to the driver may be found in the Internet. These updates may be downloaded and installed along with the driver stored in the device. While searching the Internet for the last driver or the latest updates to the driver, any fix or firmware update to the device may also be searched. If any is found, it is downloaded to fix any bugs the device may have and/or update the firmware of the device. Any fix or firmware update may or may not be stored in the storage medium in the device. If there is no Internet connection, or the latest driver found on the Internet are not more recent than the driver stored in the device, or the latest driver or updates to the driver found from the Internet are not installed successfully, the driver in the device are installed in the host. At block 645, the driver stored in the device may be updated if needed. If the latest driver or updates to the driver found in the Internet are more updated than the driver stored in the device and are successfully installed in the host, the latest driver or the updates to the driver found in the Internet may be used to update the driver stored in the device. In one embodiment, the updated driver found in the Internet may be stored in the device along with the existing driver. After the driver in the device is updated, the storage medium in the device may be protected at 650 as described above.

For security purpose, a data file anything is to be downloaded from the Internet, the file is scanned for virus. If no virus is found, a user is further asked for permission before the file is downloaded.

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A portable device comprising:
   a storage medium to store a driver for the portable device;
   an interface to provide interfacing functions compatible with a connection technology used to connect the portable device to a host system;
   a device controller to determine:
     whether the portable device is recognized by the host system, if the portable device is unrecognized by the host system then the portable device to appear itself as a flash drive to the host system, wherein if the portable device is recognized by the host system the portable device to operate for its primary function instead of an external flash drive; and
     whether to install the driver stored in the storage medium in the host system, and if so, to install the driver in the host system; and
   wherein:
     if no driver is found in the host system, the device controller is to install the driver stored in the storage medium;
     if it is found that the host system has a driver for the portable device, the device controller is to compare the driver found in the host system with the driver stored in the storage medium; and
     if the driver found in the host system is more updated than the driver stored in the storage medium, the device controller is to install the driver stored in the host system; and
     if the driver found in the host system is less updated than the driver stored in the storage medium, the device controller is to update the driver stored in the host system.

2. The portable device of claim 1, wherein the connection technology is one of:
   a standard universal serial bus (USB) technology,
   a standard wireless USB technology,
   an IEEE 1934 interface, or
   a wireless IEEE 1934 interface.

3. The portable device of claim 1, wherein the host system is one of:
   a personal computer,
   a smart phone,
   a tablet computer, or
   a netbook computer.

4. The portable device of claim 1, wherein the storage medium comprises a non-volatile memory.

5. The portable device of claim 1, wherein the device controller includes logic to encrypt the driver before sending the driver to the host system.

6. The portable device of claim 1, wherein the device controller to search the Internet for a driver for the portable device that is more updated than the driver stored in the storage medium or an update to the driver stored in the storage medium; if found, the device controller to download the more updated driver or the update from the Internet and to store the more updated driver or the update to the storage medium.

7. The portable device of claim 6, wherein the device controller to ask a user for permission before downloading the more updated driver or the update from the Internet and before storing the more updated driver or the update to the storage medium.

8. The portable device of claim 1, wherein the device controller comprises a module to automatically install the driver in the storage driver in the host system when needed.

9. The portable device of claim 1, wherein the device controller to configure the portable device to appear to the host system as an external storage drive.

10. The portable device of claim 1, wherein the device controller to protect content in the storage medium, when the portable device is coupled to the host system.

11. A non-transitory machine readable storage medium having instructions stored thereon that when executed cause a machine to perform a method, the method comprising:
    determining whether a portable device is recognized by a host system when the portable device is connected to the host system, the portable device having a driver stored in a storage medium inside the portable device;
    if the portable device is unrecognized by the host system then the portable device to configure itself to appear as a flash drive to the host system, wherein if the portable device is recognized by the host system the portable device to operate for its primary function instead of an external flash drive;
    if the portable device is recognized by the host system, determining a most updated version of the driver for the portable device;
    if the host system does not have the most updated version of the driver for the portable device, installing the most updated version of the driver in the host system from the portable device or from the Internet; and
    if the latest version of the driver is successfully installed in the host system, updating the driver stored in the storage medium with the latest version of the driver if the driver stored in the storage medium is not the latest version of the driver.

12. The non-transitory machine readable storage medium of claim 11, wherein determining a most updated version of the driver for the portable device comprises:
    if there is Internet connection, searching the Internet for a latest version of the driver for the portable device;
    selecting an updated version of driver between the latest version of the driver found from the Internet if there is Internet connection;
    using the updated version of the driver as the most updated version of the driver if the host system does not have a driver for the portable device; and
    selecting a more updated version of the driver between the updated version of the driver and the driver for the portable device in the host system if the host system has a driver as the most updated version of driver.

13. The non-transitory machine readable storage medium of claim 12 having further instructions that when executed causes the machine to perform a further method, the further method comprising:
if the Internet has the most updated version of the driver for the portable device, downloading the most updated version of the driver to the host system.

14. The non-transitory machine readable storage medium of claim 11,
wherein the portable device includes logic to encrypt the driver before sending the driver to the host system.

15. The non-transitory machine readable storage medium of claim 11 having further instructions that when executed causes the machine to perform a further method, the further method comprising:
protecting content in the storage medium from being compromised.

16. The non-transitory machine readable storage medium of claim 11 having further instructions that when executed causes the machine to perform a further method, the further method comprising:
configuring the portable device to appear to the host system as an external storage drive if the portable device is not recognized by the host system when the portable device is initially connected to the host system.

17. The non-transitory machine readable storage medium of claim 11, wherein the portable device to connect to the host system using one of:
a standard USB technology,
a wireless standard USB technology,
an IEEE 1934 interface, or
a wireless IEEE 1934 interface.

18. A non-transitory machine readable storage medium having instructions stored thereon that when executed cause a machine to perform a method, the method comprising:
recognizing a portable device as an external storage device when the portable device is coupled to a host system if the portable device is unrecognized by the host system, wherein if the portable device is recognized by the host system, the portable device to operate for its primary function instead of an external flash drive;
communicating with the portable device to enable the portable device to determine a most updated version of a driver for the portable device; and
allowing the portable device to install the most updated version of the driver in the host system from the portable device or from the Internet, if the host system does not have the most updated version of driver for the portable device.

19. The non-transitory machine readable storage medium of claim 18 having further instructions that when executed causes the machine to perform a further method, the further method comprising:
facilitating the portable device to search the Internet for a latest version of the driver for the portable device.

20. The non-transitory machine readable storage medium of claim 18 having further instructions that when executed causes the machine to perform a further method, the further method comprising:
if the Internet has the most updated version of driver for the portable device, checking if the most updated version of driver is infected by viruses, and
if not, allowing the portable device to download the most updated version of driver to the host system.

21. The non-transitory machine readable storage medium of claim 18, wherein the portable device to connect to the host system using one of:
a standard USB technology,
a wireless standard USB technology, or
an IEEE 1934 interface, and
an wireless IEEE 1934 interface.

22. The portable device of claim 1, wherein the device controller includes registers, and wherein the device controller is a wireless controller.

23. The portable device of claim 1, further comprising:
a clock generator having an oscillator to produce a clock signal for the device controller, the clock generator coupled to the device controller.

* * * * *